(12) United States Patent
Xie et al.

(10) Patent No.: US 11,659,356 B2
(45) Date of Patent: May 23, 2023

(54) SETTING DEPLOYMENT GROUP NETWORK PARAMETERS FOR IDENTIFIED LOCATION-BASED DEVICE GROUPS IN A WI-SUN FAN DATA NETWORK

(71) Applicant: Cisco Technology, Inc., San Jose, CA (US)

(72) Inventors: Mingyu Xie, Shanghai (CN); Jianfeng Mao, Shanghai (CN); Lei Zhao, Shanghai (CN); Kai Qian, Zhejiang Province (CN)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 17/199,259

(22) Filed: Mar. 11, 2021

(65) Prior Publication Data

US 2022/0295226 A1 Sep. 15, 2022

(51) Int. Cl.
| | |
|---|---|
| *H04W 4/029* | (2018.01) |
| *H04W 52/30* | (2009.01) |
| *H04W 4/02* | (2018.01) |
| *H04W 4/08* | (2009.01) |
| *H04W 72/121* | (2023.01) |
| *H04W 72/12* | (2023.01) |

(52) U.S. Cl.
CPC ........... *H04W 4/029* (2018.02); *H04W 4/023* (2013.01); *H04W 4/08* (2013.01); *H04W 52/30* (2013.01); *H04W 72/121* (2013.01); *H04W 72/1242* (2013.01)

(58) Field of Classification Search
CPC ....... H04W 4/029; H04W 4/023; H04W 4/03; H04W 72/121; H04W 72/1242; H04W 52/30
USPC ..................................................... 455/456.1
See application file for complete search history.

(56) References Cited

U.S. PATENT DOCUMENTS

| 10,548,109 B2 | 1/2020 | Webb |
| 10,700,984 B2 | 6/2020 | Savalle et al. |
(Continued)

OTHER PUBLICATIONS

Zhao et al., U.S. Appl. No. 16/782,958, filed Feb. 5, 2020.
(Continued)

*Primary Examiner* — Ted M Wang
(74) *Attorney, Agent, or Firm* — Behmke Innovation Group LLC; James M. Behmke; Jonathon P. Western (57) ABSTRACT

In one embodiment, a method comprises: identifying, by a network management device, a location-based device group in a wireless data network comprising constrained wireless network devices, including identifying an identified subset of the constrained wireless network devices as member devices based on the member devices having respective physical locations within the location-based device group; identifying, by the network management device, a member device density for the location-based device group; setting by the network management device, for the location-based device group, a set of deployment group network parameters based on the member device density; and sending, by the network management device, the set of deployment group network parameters to the location-based device group for density-based deployment thereof by the member devices.

20 Claims, 7 Drawing Sheets

(56) References Cited

U.S. PATENT DOCUMENTS

| | | | |
|---|---|---|---|
| 2011/0142207 A1* | 6/2011 | Goldman | H04L 69/28 |
| | | | 379/45 |
| 2012/0320790 A1 | 12/2012 | Shaffer et al. | |
| 2014/0092769 A1 | 4/2014 | Shaffer et al. | |
| 2014/0204799 A1 | 7/2014 | Pietrowicz et al. | |
| 2014/0222983 A1 | 8/2014 | Dasgupta et al. | |
| 2018/0124479 A1 | 5/2018 | Taylor et al. | |
| 2020/0374208 A1 | 11/2020 | Zhang et al. | |
| 2021/0267011 A1* | 8/2021 | Ligrani | H04W 4/025 |

OTHER PUBLICATIONS

Thubert et al., U.S. Appl. No. 16/814,227, filed Mar. 10, 2020.

Harada et al., "IEEE 802.15.4g Based Wi-SUN Communication System", IEICE Trans. Commun., vol. E100-B, No. 7, Jul. 2017, pp. 1032-1043.

Levis et al., "The Trickle Algorithm", Internet Engineering Task Force (IETF), Request for Comments: 6206, Mar. 2011, pp. 1-13.

Heile et al., "Wi-SUN FAN Overview", Ipwan Internet Draft, Jul. 3, 2017, [online], [retrieved on Aug. 20, 2019]. Retrieved from the Internet: URL: <https://tools.ietf.org/pdf/draft-heile-Ipwan-wisun-overview-00.pdf>, pp. 1-15.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Hui, Ed., et al., "Compression Format for IPv6 Datagrams over IEEE 802.15.4-Based Networks", Internet Engineering Task Force (IETF), Request for Comments: 6282, Sep. 2011, [online], [retrieved on Feb. 18, 2021]. Retrieved from the Internet: URL: <https://tools.ietf.org/pdf/rfc6282.pdf>, pp. 1-24.

Zhang et al., "MPLS Inter-Autonomous System (AS) Traffic Engineering (TE) Requirements", Network Working Group, Request for Comments: 4216, Nov. 2005, [online], [retrieved on Feb. 25, 2021]. Retrieved from the Internet URL: <https://tools.ietf.org/pdf/rfc4216.pdf>, pp. 1-29.

Wang et al., "Adjusting Network Parameters Dynamically to Accelerate Mesh Network Convergence", Feb. 11, 2019, [online], [retrieved on Mar. 11, 2021]. Retrieved from the Internet: URL: <https://www.tdcommons.org/cgi/viewcontent.cgi?article=3008&context=dpubs_series>, pp. 1-9.

Thubert et al., U.S. Appl. No. 16/789,862, filed Feb. 13, 2020.

* cited by examiner

SETTING DEPLOYMENT GROUP NETWORK PARAMETERS FOR IDENTIFIED LOCATION-BASED DEVICE GROUPS IN A WI-SUN FAN DATA NETWORK

TECHNICAL FIELD

The present disclosure generally relates to setting deployment group network parameters for identified location-based device groups in a WI-SUN field area network (FAN) data network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Large-scale wireless mesh networks can be deployed in the form of Internet Protocol version 6 (IPv6) wireless radio frequency (RF) mesh networks, deployed for example using wireless link layer protocols such as IEEE 802.15.4e and/or IEEE 802.15.4g (referred to herein as "IEEE 802.15.4e/g"), and/or Wireless Smart Utilities Network (Wi-SUN) according to the example IETF Internet Draft by Heile et al., "Wi-SUN FAN Overview" (draft-heile-lpwan-wisun-overview-00). Such large-scale wireless mesh networks (also referred to as field area networks (FANs)) can be used for deployment of, for example, a connected grid mesh (CG-mesh) network advanced metering infrastructure (AMI). The CG-mesh network can include hundreds or thousands of IEEE 802.15.4e/g based resource-constrained (e.g., low-power) network devices (also referred to herein as Low Power and Lossy Network (LLN) devices), where each LLN device can reach, within its transmission range, hundreds of neighboring network devices.

The Low-power and Lossy Network (LLN) can include dozens or thousands of low-power network devices: in some cases the LLN can be limited to a wireless mesh network; the LLN devices also can be configured for routing data packets according to a routing protocol designed for such low power and lossy networks, for example "RPL" according to the IETF Request for Comments (RFC) 6550, or 6LoWPAN (according to RFC 6282), etc. The low-power devices, also referred to as "constrained devices" can be constrained by processing power, memory, and energy (e.g., battery power), and therefore may require substantially-long sleep states ("standby" states) in between relatively-short active states for execution of different execution states. Further, noise and/or interference on a wireless RF channel can affect communications between LLN devices, resulting in unreliable data links that can be constrained by high loss rates, low data rates, and instability with relatively low packet delivery rates in the LLN.

A problem in deploying a large-scale LLN is that LLN devices are statically pre-configured with default settings for link layer (layer 2) parameters and/or network layer (layer 3) parameters prior to physical deployment, for example based on manufactured factory settings or initial settings installed by a service provider. Such default settings in the LLN devices, however, often cause substantial post-deployment problems since the default settings tend to be sub-optimal for the physical environment in which the large-scale LLN is deployed. Hence, reliance on default settings can result in poor network performance in different deployment environments, for example indoor versus outdoor deployments, sparse versus dense deployments, deployments encountering different network services (e.g., data traffic types, different quality of service (QoS) requirements), etc.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: identifying, by a network management device, a location-based device group in a wireless data network comprising constrained wireless network devices, including identifying an identified subset of the constrained wireless network devices as member devices based on the member devices having respective physical locations within the location-based device group; identifying, by the network management device, a member device density for the location-based device group; setting by the network management device, for the location-based device group, a set of deployment group network parameters based on the member device density; and sending, by the network management device, the set of deployment group network parameters to the location-based device group for density-based deployment thereof by the member devices.

In another embodiment, an apparatus comprises non-transitory machine readable media configured for storing executable machine readable code, a device interface circuit, and a processor circuit. The device interface circuit is configured for transmitting a data packet in a wireless data network comprising constrained wireless network devices. The processor circuit is configured for executing the machine readable code, and when executing the machine readable code operable for: identifying a location-based device group in the wireless data network, including identifying an identified subset of the constrained wireless network devices as member devices based on the member devices having respective physical locations within the location-based device group; identifying a member device density for the location-based device group; setting, for the location-based device group, a set of deployment group network parameters based on the member device density;

and sending the set of deployment group network parameters to the location-based device group for density-based deployment thereof by the member devices.

In another embodiment, one or more non-transitory tangible media are encoded with logic for execution by a machine and when executed by the machine operable for: identifying, by the machine implemented as a network management device, a location-based device group in a wireless data network comprising constrained wireless network devices, including identifying an identified subset of the constrained wireless network devices as member devices based on the member devices having respective physical locations within the location-based device group; identifying, by the network management device, a member device density for the location-based device group; setting by the network management device, for the location-based device group, a set of deployment group network parameters based on the member device density; and sending, by the network management device, the set of deployment group network parameters to the location-based device group for density-based deployment thereof by the member devices.

DETAILED DESCRIPTION

Particular embodiments provide an intelligent network configuration of a wireless data network (e.g., a Wi-SUN FAN) comprising constrained wireless network devices (e.g., Internet of Things (IoT) devices), for dynamic optimization of the wireless data network based on deployment-specific conditions and/or service-specific requirements. The dynamic setting of deployment network parameters in the wireless data network ensures that the wireless data network can be dynamically configured to account for environmental difficulties encountered in the physical deployment of the wireless data network; further, the deployment network parameters in can be dynamically changed, as needed, for specific data flows, for example increasing multicast/broadcast transmission intervals for mesh-wide data structures (e.g., refreshing a mesh security key), or increasing unicast transmission intervals for device-specific security key updates.

Example embodiments also provide an application programming interface (API) that enables an external server device to send a request for dynamically changing dynamic network parameters for at least an identified group of constrained wireless network devices, enabling a network management device to dynamically change the deployment network parameters for prioritized transmission of one or more identified data flows destined for the identified group of constrained wireless network devices.

Hence, the example embodiments enable dynamic optimization of one or more portions of a CG-mesh network based on physical deployment characteristics, environmental characteristics, traffic flow attributes, etc.

Figure 1A:
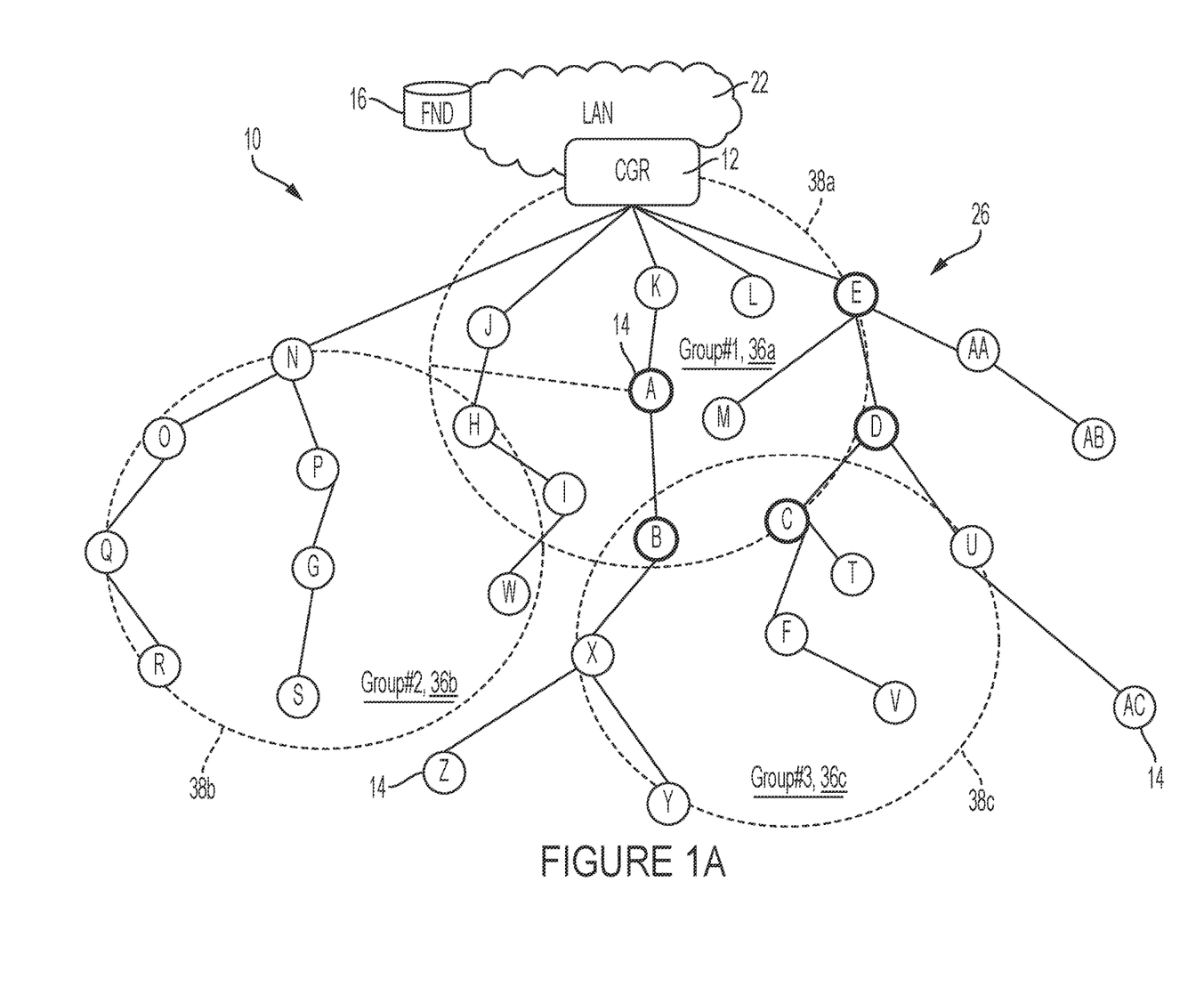
FIGS. 1A-1C illustrate an example wireless data network having an apparatus for setting deployment group network parameters for identified location-based device groups, including based on member device density in the respective groups, based on optimization of multicast transmissions, and/or based on a request for prioritization from an external server device, according to an example embodiment.
Figure 1B:
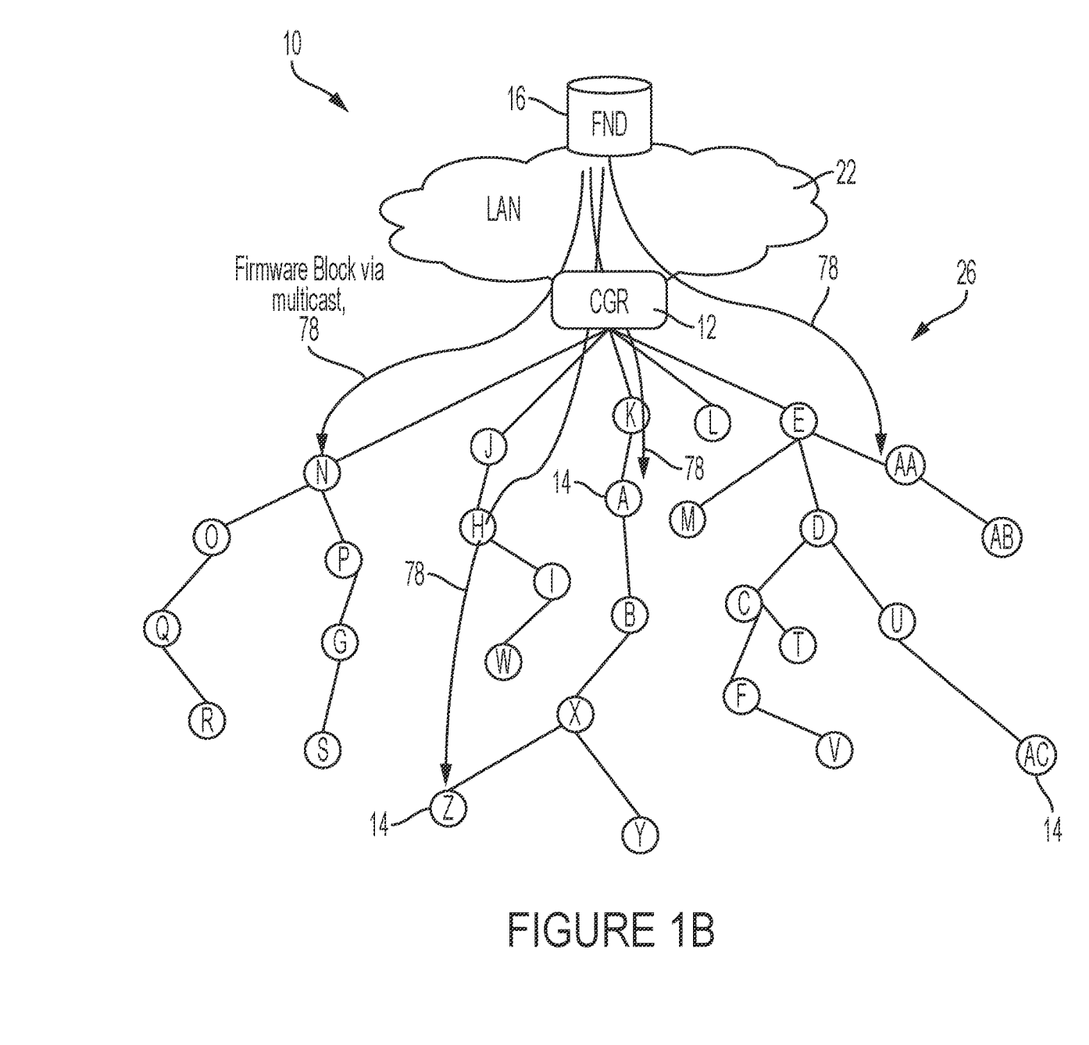
Figure 1C:
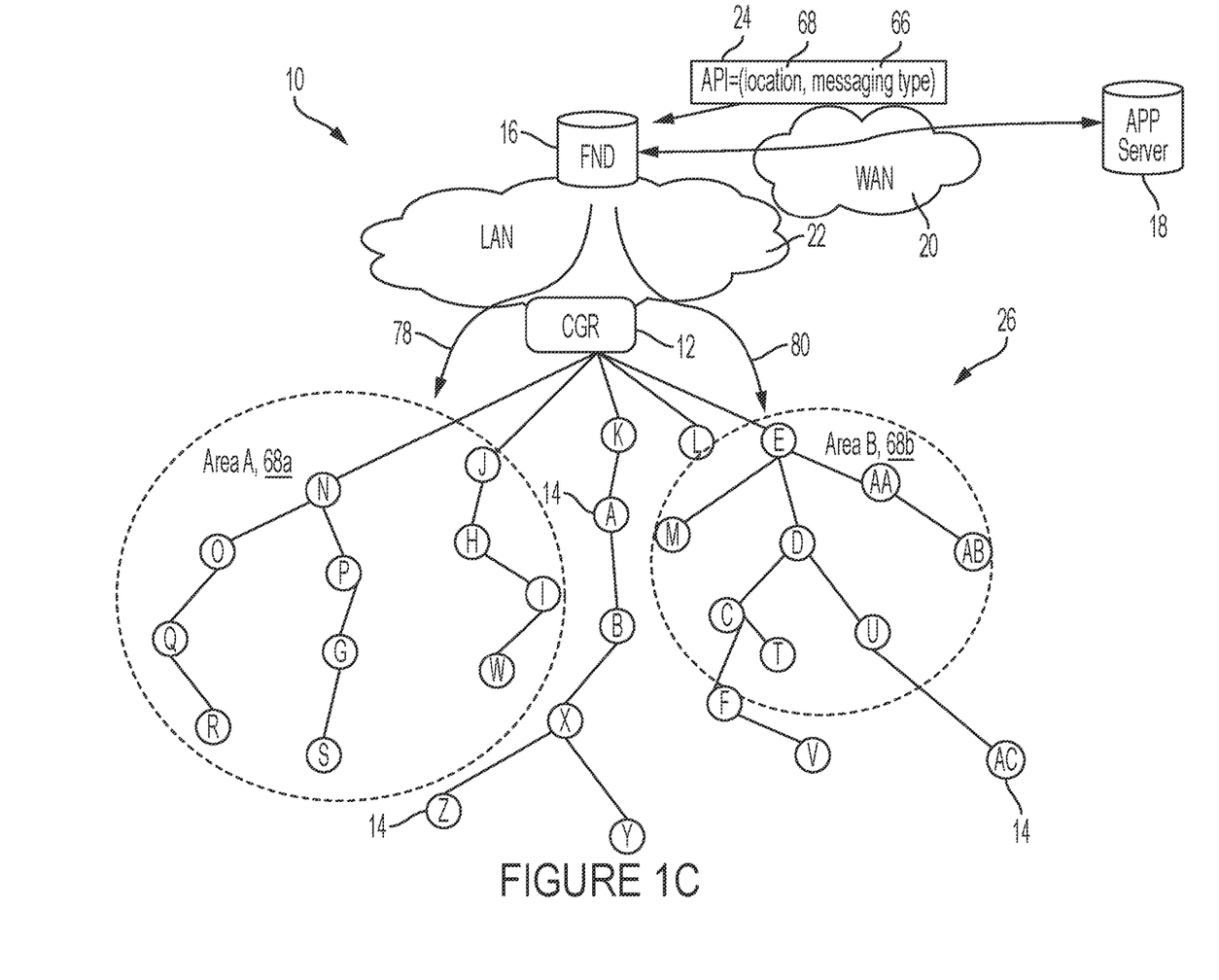

FIGS. 1A-1C illustrate an example LLN network 10 implemented as a wireless mesh data network, for example an IEEE 802.15.4e/g based CG-mesh network having a root mesh network device 12, constrained LLN devices 14, and a network management device (NMD) (e.g., a Wi-SUN Field Network Director (FND)) 16, according to an example embodiment. The root network device 12 can be configured for operating as a directed acyclic graph (DAG) root for multiple wireless constrained LLN devices 14 implemented as wireless mesh network devices, also referred to herein as wireless network devices (WNDs) 14. The example LLN network 10 can be implemented as a Wi-SUN based field area network (FAN) having a star topology or cluster topology.

The root network device "CGR ROOT" 12 can be implemented, for example, as a commercially-available Cisco® 1000 Series Connected Grid Router (CGR) from Cisco Systems, San Jose, Calif., that is modified as described herein; hence, the root mesh network device 12 also can be referred to herein as a CGR 12 or DAG root 12, or a root network device 12.

As described below, the management device (e.g., FND) 16 can be configured for deploying and managing the link-layer wireless data network 10, illustrated as a Wi-SUN FAN. As described below, the management device (e.g., FND) 16 can be configured for dynamically optimizing deployment network parameters in the Wi-SUN FAN 10 for optimized link layer communications between the WNDs 14.

The management device (e.g., FND) 16 also can cause the CGR 12 to establish network-layer routes in the Wi-SUN FAN 10 for identified data traffic flows in the Wi-SUN FAN 10, according to the dynamically-optimized deployment network parameters at the link layer. As illustrated in FIG. 1C, the management device (e.g., FND) 16 can be configured for communicating with a remote application server device 18, for example via a wide area network (WAN) (e.g., the Internet) 20 and/or a local area network 22, for reception of a request 24 for prioritized transmission to an identified location 68 in the Wi-SUN FAN 10 for an identified data flow or data type 66.

The root network device 12 can serve as a "sink" for the constrained LLN devices 14 at the network layer, for example the root network device 12 enables reachability between the wireless constrained LLN devices 14 and one or more network devices 16, 18, etc.

Each constrained LLN device "A" through "Z" and "AA" through "AC" (collectively "A" through "AC") 14 in the wireless mesh data network 10 can establish a link layer mesh topology via wireless data links according to IEEE 802.15.4e/g based Wi-SUN protocols. Each constrained LLN device "A" through "AC" 14 can be implemented as a constrained network device, or "LLN device" or "CG-mesh" device, configured for operating for example as a RPL node according to the Internet Engineering Task Force (IETF) Request for Comments (RFC) 6550.

A description will first be provided of the network layer topology according to RPL, followed by a description of the link-layer optimization by the management device (e.g., FND) 16.

The root network device 12 can provide a link layer connection (e.g., via a wireless data link, a high-speed wired backbone link, etc.) and/or a network layer connection overlying the link layer connection (e.g., via the LAN 22 and/or a wide area network 20 such as the Internet) for reaching the network manager device 16, the remote application server device 18, and/or any other remote destination device, as appropriate. Hence, each constrained LLN device 14 can be configured for address autoconfiguration, for example based on exchanging messages (via the root network device 12) with a DHCP server device (not shown), or based on IPv6 Neighbor Discovery (IPv6 ND). Hence, each constrained LLN device 14 can establish a tree-based network topology overlying the wireless mesh data network 10, described below, that is rooted at the root network device 12. Each constrained LLN device 14 also can send and receive messages associated with various network management-based services provided by the network manager device 16 via the root network device 12; each constrained LLN device 14 also can send and receive messages associated with various application services provided by the head-end server device 18 via the root network device 12.

The root network device 12 can be configured for causing creation of a tree-based topology overlying the link layer mesh data network 10 based on transmitting one or more DODAG information object (DIO) messages (not shown), for example according to RFC 6550. Each constrained LLN device 14 in the LLN 10 can join the DODAG via wireless data links in response to receiving the multicast DIO message. The wireless mesh data network 10 can be implemented as a Low-power and Lossy Network (LLN) that can include dozens or thousands of low-power wireless mesh network devices 14 each configured for routing data packets according to a routing protocol designed for such low power and lossy networks, for example RPL: such low-power router devices can be referred to as "RPL nodes"; hence, a constrained LLN device 14 also can be referred to herein as a "RPL node" or a wireless network device. Each RPL node 14 in the LLN typically is constrained by processing power, memory, and energy (e.g., battery power); interconnecting wireless data links between the RPL nodes 14 typically are constrained by high loss rates, low data rates, and instability with relatively low packet delivery rates.

A network topology (e.g., a "RPL instance" according to RFC 6550) 26 can be established based on creating routes toward a single "root" network device 12 in the form of a directed acyclic graph (DAG) toward the root network device 12, where all routes in the LLN terminate at the root network device 12 (also referred to as a "DAG destination"). Hence, the DAG also is referred to as a Destination Oriented DAG (DODAG) 26. Network traffic can move either "up" towards the DODAG root 12 or "down" towards the DODAG leaf nodes (e.g., nodes "R", "S", "V", "Y", "Z", "AB", "AC" or beyond).

The DODAG 26 can be formed based on the DIO message advertised by the DAG root 12, where a "child" network device (e.g., "E", "J", "K", "L", "N") 14 detecting the DIO can select the DAG root 12 as a parent in the identified DODAG 26 based on comparing network topology metrics (advertised in the DIO) to a prescribed objective function of the RPL instance. The "child" network device (e.g., "E", "J", "K", "L", "N") 14, upon attaching to its parent, can output its own DIO with updated network topology metrics that enable other wireless constrained LLN devices 14 to discover the DODAG 26, learn the updated network topology metrics, and select a DODAG parent. Hence, the constrained LLN devices 14 in the LLN 10 can join the DODAG 26 in response to receiving a multicast DIO message from an advertising DODAG parent device, and selecting the DODAG parent as a default route.

A single instance of the DODAG 26 also is referred to as a Personal Area Network (PAN) or a Field Area Network (FAN) in the case of Wi-SUN based deployments. Hence, a wireless mesh data network 10 can include a plurality of PANs (not shown), where each PAN includes one DAG root 12 (exclusively allocated to the PAN) and multiple wireless constrained LLN devices 14 connected exclusively within the PAN according to the DIO messages originated by the corresponding one DAG root 12. Hence, unless explicitly stated otherwise herein, a constrained LLN device 14 is configured to belong to only one PAN at a time, i.e., a constrained LLN device 14 is configured to be attached only within one DODAG, although the constrained LLN device 14 can be configured for attachment to one or more parent network devices 14 within a single DODAG.

The root network device 12 can specify within the DIO message a Mode of Operation (MOP) field value that identifies the mode of operation for the RPL instance: according to RFC 6550, the MOP field is administratively provisioned at and distributed by the DODAG root, where all nodes who join the DODAG must be able to honor the MOP in order to fully participate as a router (else they must only join as a leaf). Hence, a MOP field value of "0" identifies no downward routes are maintained by the root network device 12 or any constrained LLN device 14 (i.e., the DODAG operates in a collection-only mode); a MOP field value of "1" identifies the DODAG operates in a non-storing mode (where only the root network device 12 maintains downward routes and source routes each data packet to a destination constrained LLN device 14); and a MOP field value of "2" identifies the DODAG operates in a storing mode, where each constrained LLN device 14 stores a next-hop route for reaching an attached child network device. A MOP field value of "3" identifies the DODAG operates in a storing mode with multicast support.

Hence, downward routes (i.e., away from the DAG root) can be created in any one of the three available types of downward-routing mode in response to a constrained LLN device 14 receiving a DIO message specifying a MOP field value of "1", "2", or "3" for the RPL instance, however no downward routes can be created in the collection-only mode if the DIO message specifies a MOP field value of "0" (i.e., "MOP=0"). If downward routes are permitted as specified by the MOP field value "1", "2", or "3" in the DIO message, a DIO message can respond by generating and transmitting a Destination Advertisement Object (DAO) message: in nonstoring mode the DAO is unicast transmitted by the constrained LLN device 14 to the DAG root 12, whereas in storing mode the DAO message is unicast transmitted by the constrained LLN device 14 to each of its parents. Hence, in storing mode a RPL node unicasts its DAO message to its parent node, such that RPL nodes can store downward routing tables for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

The DAG root 12, in response to receiving the DAO messages from the RPL nodes 14 based on the DIO message specifying nonstoring mode, can build the entire DAG topology and store the DAG topology in its memory circuit 34 (illustrated in FIG. 2), including storage of heuristics of usage, path length, knowledge of device capacity, link reliability, etc.

Although the LLN 10 is illustrated as a DODAG having a root network device 12 and multiple-hop paths for reaching leaf network devices (e.g., nodes "R", "S", "V", "Y", "Z", "AB", "AC"), the LLN 10 also can be implemented as a Wi-SUN based network having a star topology or cluster topology and utilizing 6LoWPAN.

As described previously, network-layer deployments of a network topology (e.g., a DODAG according to RFC 6550) have previously assumed establishment of a link layer mesh topology by WNDs 14 having link layer parameters that that have been statically configured prior to deployment: this static configuring of link layer parameters in the WNDs 14, for example by a manufacturer or a service provider prior to installation, requires the installer of the link layer parameters to have an accurate and precise understanding of the expected environmental and physical attributes in which the Wi-SUN FAN 10 is to be deployed (e.g., indoor vs. outdoor, sparse versus dense deployments, etc.); further, the installer is required to have an accurate and precise understanding of the expected network services that are to be provided by the Wi-SUN FAN 10 in order to "tune" the Wi-SUN FAN 10 for the expected data traffic loads encountered by the expected network services (e.g., data traffic types, different quality of service (QoS) requirements), etc.

However, substantial differences exist between an outdoor wireless network compared to an indoor wireless network, which would require substantial difficulties in developing an accurate wireless site survey to determine the appropriate network parameters prior to deployment. Further, an outdoor wireless network can have changing environmental conditions that affect wireless interference due to building structures, moving objects (e.g., vehicles, etc.) that can create unpredictable multipath interference. Further, different traffic types (e.g., firmware upgrades, security key updates, etc.), could encounter difficulties due to existing link layer parameters.

According to example embodiments, the management device (e.g., FND) 16 can be configured for dynamic optimization of the wireless data network based on deployment-specific conditions and/or service-specific requirements. The dynamical installation of network parameters in the WNDs 14 (e.g., Wi-SUN FN parameters) by the management device (e.g., FND) 16 can enhance the network reliability and performance in the Wi-SUN FAN 10.

Although only the network devices "A", "Z", and "AC" are labeled with the reference numeral "14" in FIGS. 1A-1C to avoid cluttering in the Figures, it should be apparent that all the network devices "A" through "AC" are allocated the reference numeral "14" for purposes of the description herein.

Figure 2:
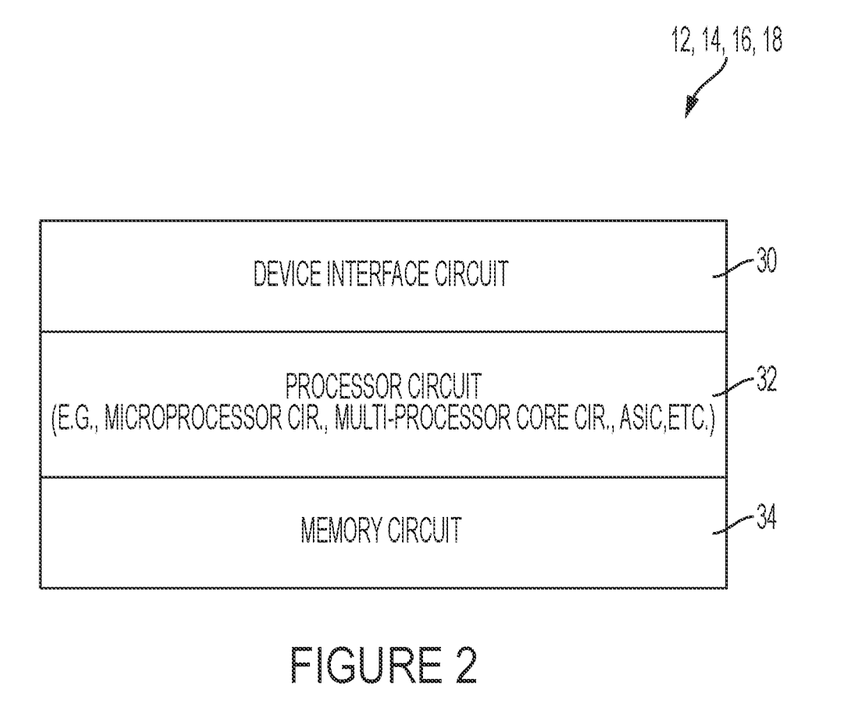
FIG. 2 illustrates an example implementation of any one of the network devices of FIGS. 1A-1C, according to an example embodiment.

FIG. 2 illustrates an example implementation of any one of the devices 12, 14, 16, and/or 18 of FIGS. 1A-1C, according to an example embodiment. Each apparatus 12, 14, 16, and/or 18 is a physical machine (i.e., a hardware device) configured for implementing network communications with other physical machines 12, 14, 16, and/or 18 via the network 10. The term "configured for" or "configured to" as used herein with respect to a specified operation refers to a device and/or machine that is physically constructed and arranged to perform the specified operation.

Each apparatus 12, 14, 16, and/or 18 can include a device interface circuit 30, a processor circuit 32, and a memory circuit 34. The device interface circuit 30 can include one or more distinct physical layer transceivers for communication with any one of the other devices 12, 14, 16, and/or 18; the device interface circuit 30 also can include an IEEE based Ethernet transceiver for communications with the devices of FIGS. 1A-1C via any type of data link (e.g., a wired or wireless link, an optical link, etc.). The processor circuit 32 can be configured for executing any of the operations described herein, and the memory circuit 34 can be configured for storing any data or data packets as described herein.

Any of the disclosed circuits of the devices 12, 14, 16, and/or 18 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit (s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 3A:
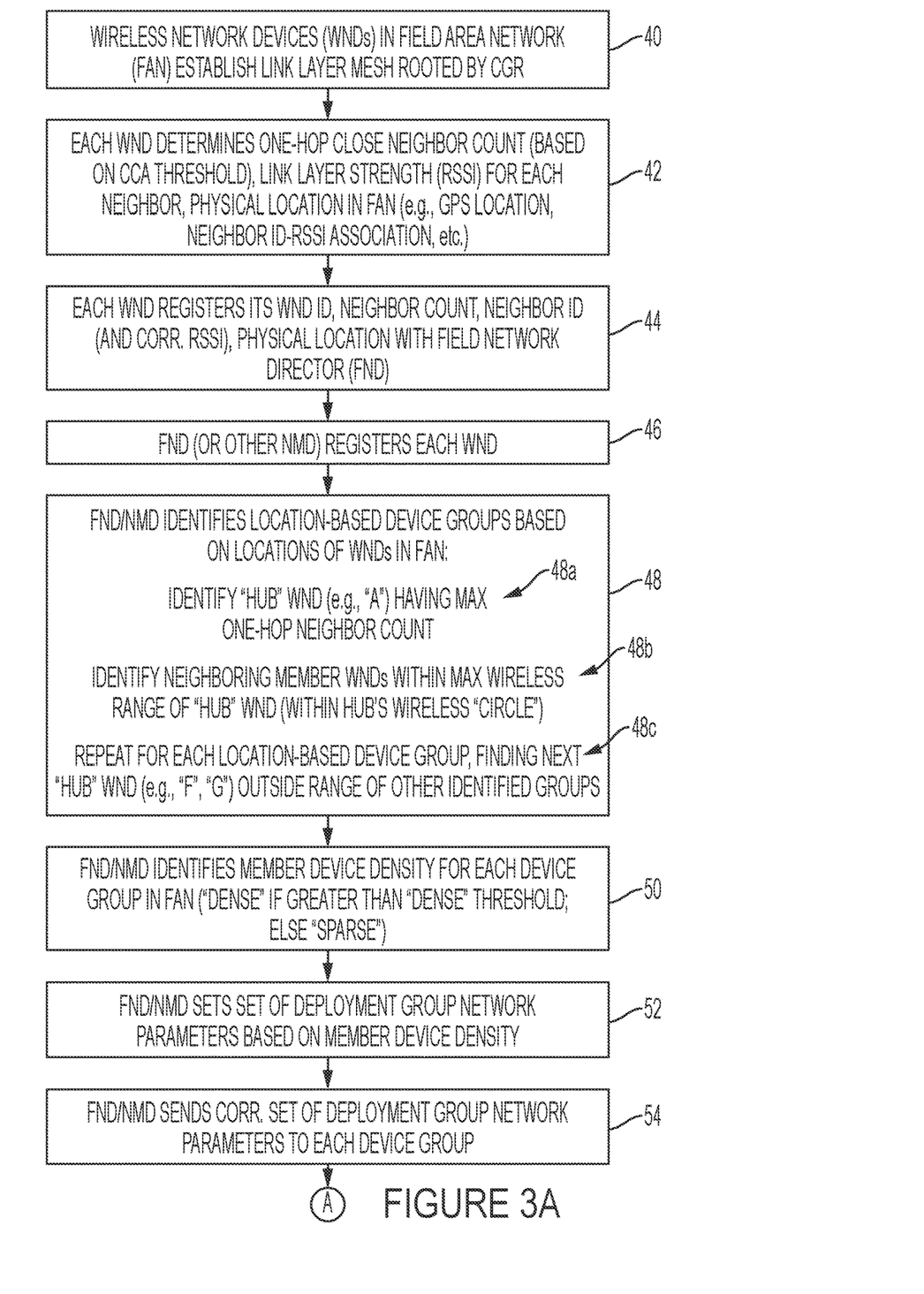
FIGS. 3A through 3C illustrate an example method of setting deployment group network parameters for identified location-based device groups, including based on member device density in the respective groups, according to an example embodiment.
Figure 3B:
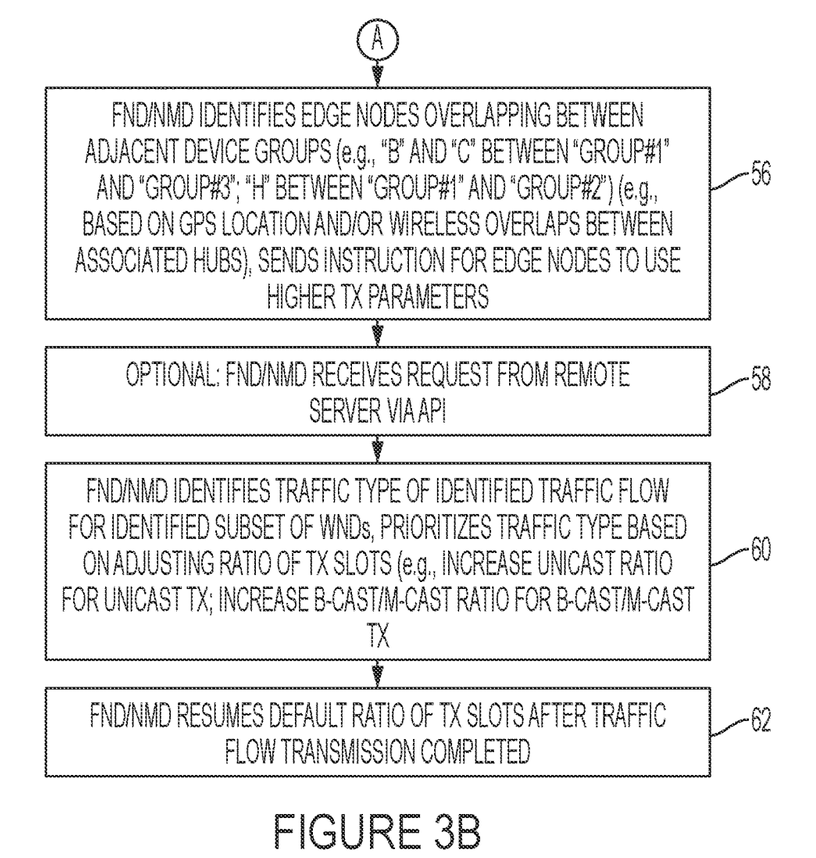
Figure 3C:
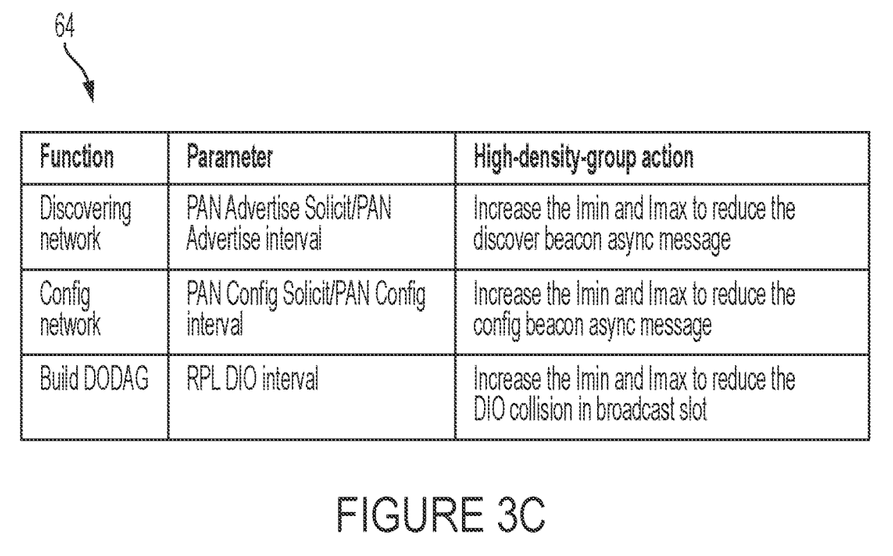
Figure 4:
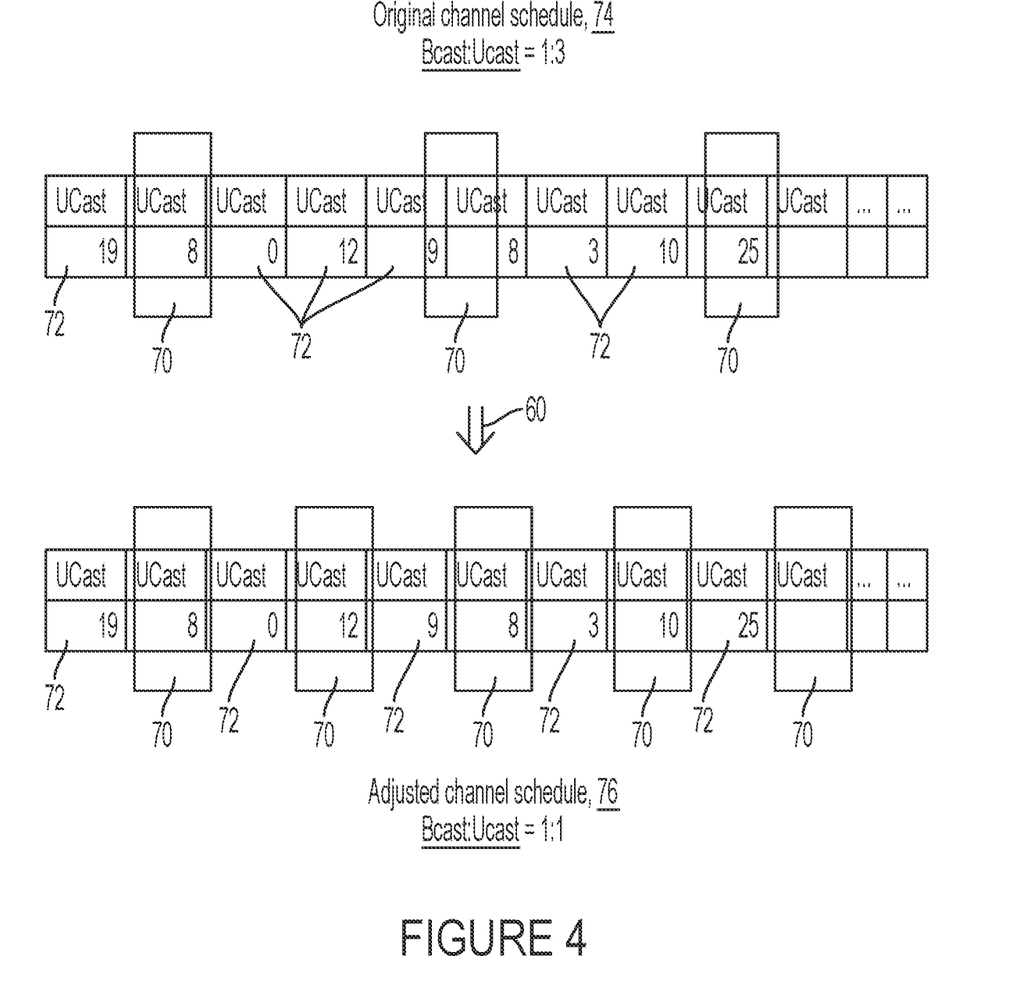
FIG. 4 illustrates prioritizing transmission of multicast transmissions based on adjusting a prescribed ratio of scheduled transmission slots to a higher ratio of multicast transmission slots, according to an example embodiment.

FIGS. 3A through 3C illustrate an example method of setting deployment group network parameters for identified location-based device groups, including based on member device density in the respective groups, according to an example embodiment. FIG. 4 illustrates prioritizing transmission of multicast transmissions based on adjusting a prescribed ratio of scheduled transmission slots to a higher ratio of multicast transmission slots, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 3A, each WND 14 in operation 40 upon initialization (e.g., initial field deployment upon initial turn-on) can participate in establishing a link-layer mesh in the Wi-SUN FAN 10, for example based on initiating link layer discovery using initial default link layer parameters that are "soft-programmed" into its memory circuit 34. Hence, each of the WNDs 14 on initialization can establish an initial (non-optimized) link layer mesh that is rooted by the CGR 12.

Each WND 14 in operation 42 can determine its one-hop close neighbors that are within its wireless transmission range, for example based on detecting that a corresponding wireless signal from each one-hop close neighbor 14 has a received signal strength indictor (RSSI) that exceeds a clear channel assessment (CCA) threshold: for example, the WND "A" 14 can determine that the WND "D" 14 is a one-hop close neighbor in response to the WND "A" 14 detecting that the RSSI value for a wireless signal transmitted by the WND "D" 14 exceeds the CCA threshold that is used for triggering link-layer collision avoidance operations (CSMA/CA) according to IEEE 802.15.4e/g.

Hence, each WND 14 in operation 42 can determine its corresponding number of one-hop neighbors (i.e., "one-hop close neighbor count") within wireless transmission range of the WND 14, along with the corresponding link layer strength (e.g., RSSI value) for each of its one-hop neighbors. Hence, the WND "A" 14 in operation 42 can store in its memory circuit 34 a plurality of neighbor entries, each neighbor entry identifying a corresponding neighbor (e.g., "B", "C", "D", "E", "H", "I", "J", "K", "L", "M") and its corresponding link layer strength value (e.g., "RSSI_B", "RSSI_C", "RSSI_D", "RSSI_E", "RSSI_H", "RSSI_I", "RSSI_J", "RSSI_K", "RSSI_L", "RSSI_M").

Each WND 14 in operation 42 also determine and can store in its memory circuit 34 one or more physical location identifiers that identify the physical location of the WND 14 in the Wi-SUN FAN 10, for example based on GPS coordinates, or sharing location-based data as described for example in U.S. Pat. No. 10,548,109.

Each WND 14 in operation 44 can register itself with the management device (e.g., FND) 16 for initial deployment of the Wi-SUN FAN 10, for example before or after establishment of the initial link layer mesh network by the WNDs 14 and establishment of a network-based topology such as a DODAG 26. For example, each WND 14 in operation 44 can send a CoAP message specifying parameters identified in operation 42. Each WND 14 also can access a DHCP server and/or AAA-based authentication server (not shown) in the management device (e.g., FND) 16, as needed.

The processor circuit 32 of the management device (e.g., FND) 16 in operation 46 can register each WND 14 (e.g., based on creating a device entry in its memory circuit 34) in response to the device interface circuit 30 of the management device (e.g., FND) 16 receiving a registration from a corresponding one of the WNDs 14. As described previously, each registration request output by a WND 14 can specify a corresponding one-hop close neighbor count, a neighbor identifier (and corresponding link layer strength) for each one-hop close neighbor, and a corresponding physical location identifier that identifies the physical location of the registering WND 14; hence, the processor circuit 32 of the management device (e.g., FND) 16 in operation 46 can register each WND 14 by its network identifier (e.g., IPv6 address), one-hop close neighbor count, list of one-hop close neighbors and respective link layer strength values, and physical location identifier.

The processor circuit 32 of the management device (e.g., FND) 16 in operation 48 can initiate link-layer optimization of the Wi-SUN FAN 10 based on identifying, within the Wi-SUN FAN 10, a plurality of location-based device groups (e.g., 36*a*, 36*b*, and 36*c* of FIG. 1A), where each location-based device group 36 comprises an identified subset of the WNDs 14 that are designated as "constrained wireless network member devices" for the location-based device group 36. As described below, a WND 14 can be a member of one or more location-based device groups 36.

In particular, the processor circuit 32 of the management device (e.g., FND) 16 in operation 48*a* can initiate identification of a location-based device group 36 based on identifying a "first" WND 14 having the maximum one-hop neighbor count: as illustrated in FIG. 1A, the processor circuit 32 of the management device (e.g., FND) 16 in operation 48*a* can identify the WND "A" as the "first" WND 14 (or "hub" of the location-based device group 36*a*) based on determining the WND "A" 14 has the maximum one-hop neighbor count of ten (10) neighbors. The processor circuit 32 of the management device (e.g., FND) 16 in operation 48*b* also can identify the neighboring member WNDs 14 that are within the wireless transmission range 38, namely devices "B", "C", "D", "E", "H", "I", "J", "K", "L", and "M", for example based on the list of neighbors provided by the WND "A" 14 during registration thereof in operation 46. Hence, the processor circuit 32 of the management device (e.g., FND) 16 can identify a subset of the constrained wireless network devices 14 as member devices of a location-based device group 36*a*, based on their respective physical locations within the location-based device group 36*a* established based on the wireless transmission range 38*a*.

The processor circuit 32 of the management device (e.g., FND) 16 in operation 48*b* also can confirm the membership count and membership identity for the location-based device group 36 (e.g., 36*a*) based on cross-referencing the list of neighbors, for example based on determining (from the registration of device "A") that "B" is a neighbor of "A", and confirming (from the registration of device "B") that "A" is a neighbor of "B", and repeating the confirmation for each of the devices "C", "D", "E", "H", "I", "J", "K", "L", and "M". Hence, the processor circuit 32 of the management device (e.g., FND) 16 in operation 48*b* can selectively exclude from membership any constrained network device 14 that has only one-way membership indicating an unreliable data link, for example in the case where device "W" identifies device "A" as its neighbor but device "A" does not identify "W" as its neighbor (e.g., "A" and "W" do not have a reliable data link and therefore "W" is deemed outside the wireless transmission range 38*a* of the "hub" device "A" 14 for the location-based device group 36*a*).

The processor circuit 32 of the management device (e.g., FND) 16 in operation 48*c* can repeat the identification of a "hub" WND 14 for each location-based device group 36, for example identifying the WND "G" 14 as the "first" or "hub"

WND 14 for the location-based device group 36b, and identifying the WND "F" as the "first" or "hub" WND 14 for the location-based device group 36b. As illustrated in FIG. 1A, the processor circuit 32 of the management device (e.g., FND) 16 in operation 48b can identify, for the location-based device group 36b, the eight (8) constrained wireless network member devices (e.g., "H", "N", "O", "P", "Q", "R", "S", "W") 14 based on the wireless transmission range 38b of the "hub" WND "G" 14; the processor circuit 32 of the management device (e.g., FND) 16 in operation 48b also can identify, for the location-based device group 36c, the seven (7) constrained wireless network member devices (e.g., "B", "C", "T", "V", "X", and "Y") based on the wireless transmission range 38c of the "hub" WND "F" 14.

The processor circuit 32 of the management device (e.g., FND) 16 in operation 48 also can select "hubs" for respective location-based device groups 36 based on a combination of the relative maximum one-hop neighbor count, in combination with the physical location of the "hub" 14 and/or the number of hops from the root CGR 12, for example to provide a more even distribution of location-based device groups 36.

The processor circuit 32 of the management device (e.g., FND) 16 in operation 50 can identify, for each location-based device group 36, the corresponding member device density, relative to one or more "density" thresholds. As described previously, the location-based device group 36a has a corresponding member device density of ten ("10") member devices; the location-based device group 36b has a corresponding member device density of eight ("8") member devices; and the location-based device group 36c has a corresponding member device density of seven ("7") member devices. Hence, the processor circuit 32 of the management device (e.g., FND) 16 in operation 50 can utilize a prescribed "Dense" threshold (e.g., "Dense≥8"; "Sparse<8"), where "≥" is a "greater than" operand, and "<" is a "less than" operand. Hence, the processor circuit 32 of the management device (e.g., FND) 16 in operation 50 can identify that the location-based device group 36a and the location-based device group 36b each have a "Dense" member device density, whereas the location-based device group 36c has a "Sparse" member device density.

Hence, the processor circuit 32 of the management device (e.g., FND) 16 in operation 52 can set a corresponding set of deployment group network parameters for each location-based device group 36, described below, based on the corresponding member device density, and send in operation 54 the corresponding set of deployment group network parameters to each location-based device group 36. For example, the processor circuit 32 of the management device (e.g., FND) 16 can cause the device interface circuit 30 to unicast transmit a corresponding instruction to each "hub" (e.g., "A" of 36a, "G" of 36b, and "F" of 36c), the corresponding instruction causing the "hub" to broadcast the deployment group network parameters for the corresponding location-based device group 36, for delivery to each of the member network devices within the corresponding wireless transmission range 38a, 38b, or 38c; the hub-based broadcast eliminates the need for the management device (e.g., FND) 16 or the CGR 12 to unicast transmit the instructions to the devices 14.

Hence, the location-based device groups 36a and location-based device group 36b can receive, from the management device (e.g., FND) 16, instructions for installing the "Dense" deployment group network parameters, whereas the location-based device group 36c can receive, from the management device (e.g., FND) 16, instructions for installing the "Sparce" deployment group network parameters. As described below with reference to FIG. 3B, the processor circuit 32 of the management device (e.g., FND) 16 in operation 56 can improve wireless link layer reliability between location-based device groups 36 based on identifying group edge nodes, and maintaining the wireless link layer parameters for the group edge nodes at higher transmission levels (e.g., higher default levels) to ensure reliable link layer connections between the location-based device groups 36.

In particular, referring to FIG. 3B, the processor circuit 32 of the management device (e.g., FND) 16 in operation 56 can identify one or more edge nodes that provide overlap between two or more location-based device groups 36, for example based on the physical locations of the edge nodes within the overlapping location-based device groups 36, or based on a determined wireless overlap of the two or more location-based device groups 36. As illustrated in FIG. 1A, the processor circuit 32 of the management device (e.g., FND) 16 can determine in operation 56 that WNDs "B" and "C" 14 can serve as edge nodes between the location-based device group 36a and 36c, and that the WND "H" 14 can serve as an edge node between the location-based device groups 36a and 36b. As described above, the processor circuit 32 of the management device (e.g., FND) 16 in operation 56 also can send an instruction (via unicast messages) to the edge nodes "B", "C", and "H" 14 to use a higher transmission power to ensure reliable link layer communications between the location-based device groups 36.

Hence, the management device (e.g., FND) 16 can adjust link layer parameters for members of a location-based device group 36 based on member device density for each location-based device group 36, while maintaining reliability between the location-based device groups 36 based on increased transmission parameters in the edge nodes providing overlapping coverage. FIG. 3C illustrates example parameters 64, any one or more of which can be adjusted for link layer optimization of transmissions within the location-based device groups 36, where any one or more of the parameters 64 can be set for the member devices 14 within a specific wireless transmission range 38, resulting in a corresponding set of deployment group network parameters for each location-based device group 36.

As illustrated in FIG. 3C, example parameters 64 can include changing Trickle-based time intervals "Imin" (minimum Trickle interval parameter) and "Imax" (maximum Trickle interval parameter), described in detail in the IETF RFC 6206 and RFC 6550, based on the determined density of the location-based device group 36. For example, the Trickle-based time intervals "Imin" and "Imax" can be increased in order to minimize collisions in higher-density location-based device groups (e.g., 36a or 36b), or decreasing the Trickle-based time intervals "Imin" and "Imax" in lower-density location-based device groups (e.g., 36c) in order to improve probability of detecting wireless transmissions.

As illustrated in FIG. 1C, the adjustment of the Trickle-based time intervals by the processor circuit 32 of the management device (e.g., FND) 16 can be used for various network functions. For example, the management device (e.g., FND) 16 can change the Trickle-based time intervals "Imin" and "Imax" for a PAN advertise solicit interval and/or PAN advertise interval during network discovery, for example to reduce the use of the discover beacon async message. The management device (e.g., FND) 16 also can change the Trickle-based time intervals "Imin" and "Imax"

for a PAN configuration solicit interval and/or PAN configuration interval during network configuration, for example to reduce the configuration beacon async message. The management device (e.g., FND) 16 also can change the Trickle-based time intervals "Imin" and "Imax" for a DIO or DAO-related message transmission during building of the DODAG 26, for example to reduce the likelihood of a collision of DIO and/or DAO messages within a broadcast slot. Other parameters can include changing "Imin" and "Imax" intervals for security-based Extensible Authentication Protocol over LAN (EAPOL) and key exchange intervals, changing "Imin" and "Imax" for CoAP registration messages used during FND registration, etc.

Hence, the management device (e.g., FND) 16 can change any of the parameters 64 to improve network discovery, network configuration, or DODAG formation in a manner that minimizes unnecessary messages and/or collisions in location-based device groups 36 that have been identified by the management device (e.g., FND) 16 as having a dense member device density. The corresponding set of deployment group network parameters 64 for a corresponding location-based device group 36 also can improve network formation and convergence, for example in response to a restart or reformation operation, for example if the Wi-SUN FAN 10 needs to be rebuilt due to a power outage, etc.

The management device (e.g., FND) 16 also can be configured for optimizing link-layer parameters among selected WNDs 14 or optimized transmission of identified data flows to the selected WNDs 14, for example based on prioritizing between multicast transmissions (as in FIG. 1B and FIG. 4), or in response to a request 24 related to an identified flow of data packets.

As illustrated in FIGS. 1C and 3B, the device interface circuit 30 of the management device (e.g., FND) 16 can be configured for receiving in operation 58, from the remote application server device 18, a request 24 for prioritization of an identified data flow (e.g., based on message type 66) that is destined for an identified group 68 of constrained wireless network devices 14, where the group 68 can be based on geographic location, deployment region, etc.

Alternately, the management device (e.g., FND) 16 can determine from another internal source (e.g., another management entity such as a DHCP server, an AAA-based authentication server, etc.), that various messages need to be transmitted to selected WNDs 14 according to either a multicast transmission (e.g., for a PAN-wide mesh security key, firmware upgrade, etc.), or a unicast transmission (e.g., updating device-specific security keys, IEEE 802.11i authentication/handshake messages, etc.).

The processor circuit 32 of the management device (e.g., FND) 16 in operation 60 can identify the traffic type of the identified traffic flow for the identified subset of WNDs 14, and prioritize the distribution of the traffic type based on adjusting the ratio of scheduled slots between broadcast slots 70 and unicast slots 72, illustrated in FIG. 4. In particular, the processor circuit 32 of the management device (e.g., FND) 16 in operation 60 can increase the availability of broadcast slots 70 based on changing from the prescribed ratio (1:3) of scheduled transmission slots 74 (one broadcast slot 70 for every three (3) unicast slots 72) to an adjusted ratio (1:1) of scheduled transmission slots 76 (one broadcast slot 70 for each unicast slot 72), and sending an instruction for distribution to all the WNDs 14 to implement the adjusted ratio (1:1) of scheduled transmission slots 76 as illustrated in FIG. 1B (e.g., for firmware updates, refreshed mesh security keys, etc.). The processor circuit 32 of the management device (e.g., FND) 16 also can send an instruction for distribution to an identified destination group 68, illustrated in FIG. 1C, to implement the adjusted ratio (1:1) of scheduled transmission slots 76. Hence, the management device (e.g., FND) 16 can configure the WNDs 14 in the destination group 68a to implement the adjusted ratio (1:1) of scheduled transmission slots 76 for increased broadcast slots 70 (along with increased Trickle intervals, as desired) for multicast traffic 78, whereas the management device (e.g., FND) 16 can configure the WNDs 14 in the destination group 68b to allocate more unicast slots 72 relative to the prescribed ratio (1:3) of scheduled transmission slots 74 (e.g., a 1:6 ratio) (along with increased Trickle intervals, as desired), for prioritized transmissions of unicast data traffic 80.

The processor circuit 32 of the management device (e.g., FND) 16 in operation 62 also can resume the "default" or prescribed ratio (1:3) of scheduled transmission slots 74 in the identified areas 68 after completed transmission of the identified data flows, based on sending an updated instruction to the WNDs 14 (either as a unicast instruction or multicast instruction, as appropriate).

According to example embodiments, link layer Wi-SUN FAN parameters can be dynamically adjusted for optimized transmissions based on device density throughout the deployment region, and/or based on prioritization of scheduling based on device flows, independent and distinct from any operations performed by network layer protocols (e.g., RPL) or above. The example embodiments enable grouping of wireless network devices into location-based device groups based on physical locations to account for different environmental conditions encountered in different deployment regions; the example embodiments also enable dynamic adjustment of link layer transmission parameters based on member device density in the location-based device groups.

The example embodiments also enable dynamic optimization of link layer parameters for identified traffic flows destined for identified groups of wireless network devices within one or more of the location-based device groups, enabling link layer optimization based on service type, scheduling optimization for multicast traffic or unicast traffic, or other upper layer application flows as identified via an application programming interface (API) by an external server device. Hence, the example embodiments can dynamically optimize link layer parameters for network operations, or customer-specific upper layer applications provided by an external server device.

Although the example embodiments have been described with respect to using RPL for generating a DAG-based network topology, other non-RPL protocols can be used for establishing a network topology (overlying a link-layer mesh).

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:
1. A method comprising:
   identifying, by a network management device, a location-based device group in a wireless data network comprising constrained wireless network devices, including identifying an identified subset of the constrained wireless network devices as member devices based on the member devices having respective physical locations within the location-based device group;

identifying, by the network management device, a member device density for the location-based device group;

setting by the network management device, for the location-based device group, a set of deployment group network parameters based on the member device density; and sending, by the network management device, the set of deployment group network parameters to the location-based device group for density-based deployment thereof by the member devices.

2. The method of claim 1, wherein the identifying of the location-based device group further comprises identifying a plurality of location-based device groups, including:

identifying, for each location-based device group, a corresponding first of the member devices having a maximum one-hop neighbor count, and identifying neighboring member devices within a maximum wireless range of the first member device; and repeating, for each location-based device group, identification of a corresponding first member device having a relative maximum one-hop neighbor count, and identification of the corresponding neighboring member devices within the corresponding maximum wireless range of the corresponding first member device.

3. The method of claim 2, further comprising:

identifying one or more edge nodes providing overlap between two or more location-based device groups based on one or more of a corresponding determined physical location of the one or more edge nodes, or a determined wireless overlap of the two or more location-based device groups; and instructing the one or more edge nodes to increase transmission power for transmissions between the two or more location-based device groups.

4. The method of claim 1, wherein the member device density is based on whether a corresponding number of the member devices exceeds a prescribed threshold.

5. The method of claim 1, wherein the setting includes one or more of increasing Trickle time intervals to minimize collisions in higher-density location-based device groups, or decreasing the Trickle time intervals in lower-density location-based device groups.

6. The method of claim 5, wherein the set of deployment group network parameters include any one or more of a personal area network (PAN) advertise solicit interval, a PAN advertise interval, a PAN configuration solicit interval, a PAN configuration interval, a destination oriented directed acyclic graph (DODAG) information object (DIO) interval, a minimum trickle interval parameter, or a maximum trickle interval parameter.

7. The method of claim 1, further comprising:

determining an identified traffic type, destined for at least an identified subset of the constrained wireless network devices, to be one of a unicast transmission or a multicast transmission; and prioritizing the one identified traffic type based on adjusting a prescribed ratio of scheduled transmission slots, for at least the identified subset of constrained wireless network devices, to one of a higher ratio of unicast transmission slots for the unicast transmission or multicast transmission slots for the multicast transmission.

8. The method of claim 7, further comprising resuming the prescribed ratio of scheduled transmission slots following completed transmission of the one identified traffic type to said at least the identified subset of constrained wireless network devices.

9. The method of claim 1, further comprising:

receiving, by the network management device, a request for prioritization for an identified data flow to an identified group of the constrained wireless network devices; and changing, by the network management device, the set of deployment group network parameters for prioritized transmission of the identified data flow to the identified group of the constrained wireless network devices.

10. An apparatus implemented as a physical machine, the apparatus comprising:

non-transitory machine readable media configured for storing executable machine readable code;

a device interface circuit configured for transmitting a data packet in a wireless data network comprising constrained wireless network devices; and a processor circuit configured for executing the machine readable code, and when executing the machine readable code operable for:

identifying a location-based device group in the wireless data network, including identifying an identified subset of the constrained wireless network devices as member devices based on the member devices having respective physical locations within the location-based device group, identifying a member device density for the location-based device group, setting, for the location-based device group, a set of deployment group network parameters based on the member device density, and sending the set of deployment group network parameters to the location-based device group for density-based deployment thereof by the member devices.

11. The apparatus of claim 10, wherein the processor circuit is configured for identifying a plurality of location-based device groups based on:

identifying, for each location-based device group, a corresponding first of the member devices having a maximum one-hop neighbor count, and identifying neighboring member devices within a maximum wireless range of the first member device; and repeating, for each location-based device group, identification of a corresponding first member device having a relative maximum one-hop neighbor count, and identification of the corresponding neighboring member devices within the corresponding maximum wireless range of the corresponding first member device.

12. The apparatus of claim 11, wherein the processor circuit is configured for:

identifying one or more edge nodes providing overlap between two or more location-based device groups based on one or more of a corresponding determined physical location of the one or more edge nodes, or a determined wireless overlap of the two or more location-based device groups; and instructing the one or more edge nodes to increase transmission power for transmissions between the two or more location-based device groups.

13. The apparatus of claim 10, wherein the member device density is based on whether a corresponding number of the member devices exceeds a prescribed threshold.

14. The apparatus of claim 10, wherein the processor circuit is configured for setting the deployment group network parameters based one or more of increasing Trickle time intervals to minimize collisions in higher-density location-based device groups, or decreasing the Trickle time intervals in lower-density location-based device groups.

15. The apparatus of claim 14, wherein the set of deployment group network parameters include any one or more of a personal area network (PAN) advertise solicit interval, a PAN advertise interval, a PAN configuration solicit interval, a PAN configuration interval, a destination oriented directed acyclic graph (DODAG) information object (DIO) interval, a minimum trickle interval parameter, or a maximum trickle interval parameter.

16. The apparatus of claim 10, wherein the processor circuit further is configured for:
   determining an identified traffic type, destined for at least an identified subset of the constrained wireless network devices, to be one of a unicast transmission or a multicast transmission; and
   prioritizing the one identified traffic type based on adjusting a prescribed ratio of scheduled transmission slots, for at least the identified subset of constrained wireless network devices, to one of a higher ratio of unicast transmission slots for the unicast transmission or multicast transmission slots for the multicast transmission.

17. The apparatus of claim 16, wherein the processor circuit is configured for resuming the prescribed ratio of scheduled transmission slots following completed transmission of the one identified traffic type to said at least the identified subset of constrained wireless network devices.

18. The apparatus of claim 10, wherein:
   the device interface circuit is configured for receiving a request for prioritization for an identified data flow to an identified group of the constrained wireless network devices;
   the processor circuit configured for changing the set of deployment group network parameters for prioritized transmission of the identified data flow to the identified group of the constrained wireless network devices.

19. One or more non-transitory tangible media encoded with logic for execution by a machine and when executed by the machine operable for:
   identifying, by the machine implemented as a network management device, a location-based device group in a wireless data network comprising constrained wireless network devices, including identifying an identified subset of the constrained wireless network devices as member devices based on the member devices having respective physical locations within the location-based device group;
   identifying, by the network management device, a member device density for the location-based device group;
   setting by the network management device, for the location-based device group, a set of deployment group network parameters based on the member device density; and
   sending, by the network management device, the set of deployment group network parameters to the location-based device group for density-based deployment thereof by the member devices.

20. The one or more non-transitory tangible media of claim 19, wherein the identifying of the location-based device group further comprises identifying a plurality of location-based device groups, including:
   identifying, for each location-based device group, a corresponding first of the member devices having a maximum one-hop neighbor count, and identifying neighboring member devices within a maximum wireless range of the first member device; and
   repeating, for each location-based device group, identification of a corresponding first member device having a relative maximum one-hop neighbor count, and identification of the corresponding neighboring member devices within the corresponding maximum wireless range of the corresponding first member device.

* * * * *